(No Model.) 2 Sheets—Sheet 1.
H. J. RICHTER.
BICYCLE ATTACHMENT.
No. 591,636. Patented Oct. 12, 1897.
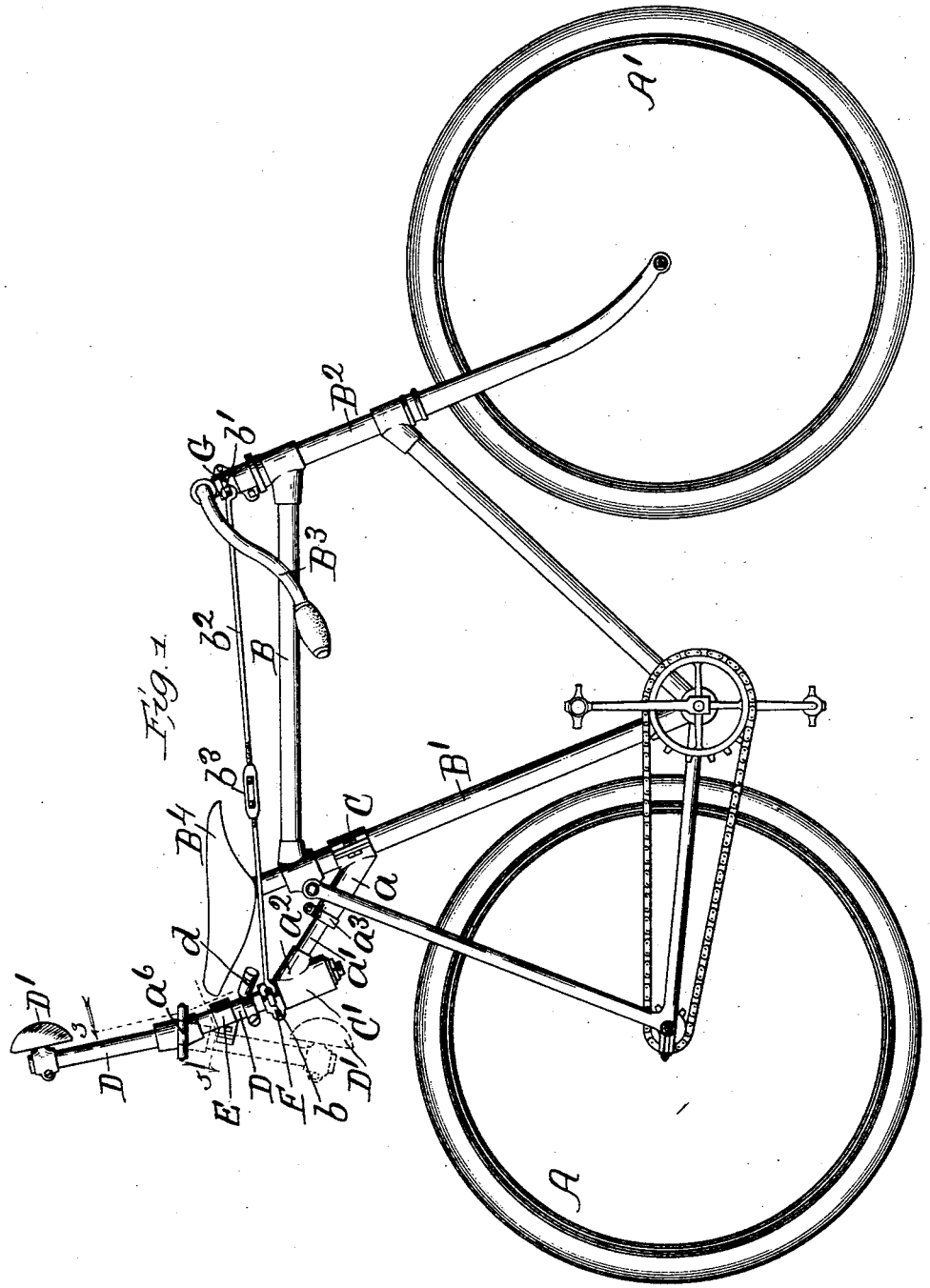
Witnesses:
Chas. E. Gaylord.
Lute J. Siter.
Inventor,
H. J. Richter.
By L. B. Coupland & Co.
Attys.

(No Model.)
H. J. RICHTER.
BICYCLE ATTACHMENT.
No. 591,636.      Patented Oct. 12, 1897.
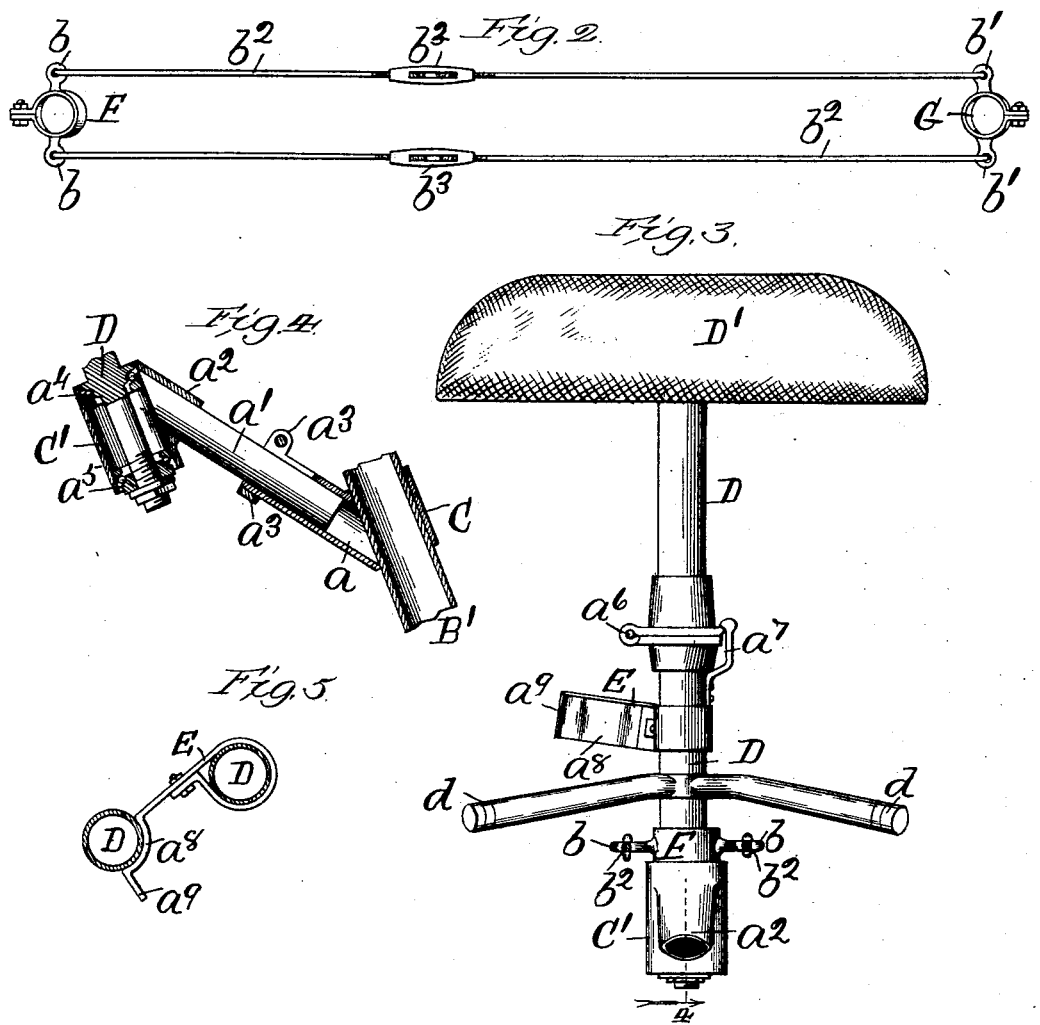

UNITED STATES PATENT OFFICE.

HARRY J. RICHTER, OF CHICAGO, ILLINOIS.

BICYCLE ATTACHMENT.

SPECIFICATION forming part of Letters Patent No. 591,636, dated October 12, 1897.

Application filed October 5, 1896. Serial No. 607,910. (No model.)

*To all whom it may concern:*

Be it known that I, HARRY J. RICHTER, a citizen of the United States, residing at Chicago, in the county of Cook and State of Illinois, have invented certain new and useful Improvements in Bicycle Attachments; and I do hereby declare the following to be a full, clear, and exact description of the invention, such as will enable others skilled in the art to which it appertains to make and use the same.

This invention relates to a combined back-rest and steering attachment for bicycles and the like, and has for its object to provide a device of this character whereby the rider is enabled to steer while seated in an upright resting position without having hold of the usual handle-bar.

Figure 1 is a front elevation of a bicycle embodying my improved features; Fig. 2, a plan of the parts connecting the back-rest and the steering-head; Fig. 3, a detached elevation on line 3, Fig. 1, looking in the direction indicated by the arrow; Fig. 4, a broken-away longitudinal section on line 4, Fig. 3; and Fig. 5, a horizontal section on line 5, Fig. 1.

A represents the driving-wheel; A', the steering-wheel; B, the upper main part of the frame; B', the center stay-tube; B², the front frame-tube; B³, the handle-bar, and B⁴ the saddle or seat.

This attachment is designed for use on the different styles of wheels. The description will therefore be limited to the improved features.

A sleeve C is clamped on the upper part of the frame-tube B' and is provided with a tube or socket extension $a$, set at an inclined angle, as shown. The lower end of a tube $a'$ is inserted in the tube $a$, the upper end being inserted in a socket $a^2$, formed on the bearing-sleeve C'. A clamping-collar $a^3$ provides for a longitudinal adjustment of the tube $a'$ in shortening or lengthening this connection. The lower end of a combined tubular back-rest and steering-post D is loosely inserted in the sleeve C', in which it is adapted to turn, and is provided with ball-bearings $a^4 a^5$, as shown in Fig. 4. A back-rest bar D' is adjustably mounted on the upper end of post D. This post is divided into two parts near its longitudinal center and is connected by a hinged joint $a^6$, so that the back-rest part may be turned down sidewise to the position indicated by dotted lines in Fig. 1 when not required for use. A spring-catch $a^7$ serves to lock the hinged joint $a^6$ and secure the back-rest in position for use.

A spring-bracket E, Figs. 1, 3, and 5, is clipped on the post D, the outer part being provided with a recess $a^8$ and terminating in the bent-around end $a^9$. When the back-rest is turned downwardly, the upper part of post D comes in contact with the end $a^9$ and forces the bracket E back, so that the post enters the recess $a^8$ and is securely held therein against swinging about.

A collar F, Figs. 1, 2, and 3, is mounted on the back-rest post and is provided on opposite sides with laterally-projecting lugs $b\ b$. A companion collar G is mounted on the steering-head H and is provided with corresponding lugs $b'\ b'$. These two collars are connected on opposite sides by connecting-rods $b^2\ b^2$, having their respective ends attached to the lugs formed thereon, as shown in Fig. 2. These connecting-rods are divided near their longitudinal center and are joined by nuts $b^3\ b^3$, having a threaded engagement, and which provide means for a proper adjustment of these parts. By this arrangement the rider may release his hold on the handle-bar, assume an upright position, lean against the back-rest bar, and steer the bicycle by a slight movement or twist of the body and bring a greater pressure to bear on one end of the rest-bar than on the other, in accordance with the direction in which the wheel is to be guided, the back-rest post turning in its bearings. An auxiliary handle-bar $d$ is mounted on the back-rest post back of the saddle and in a convenient position to be grasped with the hands and assist in the operation of steering when the hold on the handle-bar proper has been released and the rider is leaning back in a resting position. This auxiliary handle-bar also provides means for steering when the rider desires to change his position by leaning back, when the back-rest may be in its turned-down or folded position.

Having thus described my invention, what I claim as new, and desire to secure by Letters Patent, is—

1. In a back-rest and steering attachment for bicycles and the like, the combination with a back-rest post, provided with suitable bearings in which to turn, of a collar, mounted thereon, the steering-head, the companion collar, mounted on said head, and the companion rods, connecting said collars, whereby a bicycle may be steered by the pressure of the body against the back-rest, substantially as described.

2. In a bicycle, the combination with the frame, of the sleeve, C, provided with a tube or socket extension, $a$, a tube $a'$, having its lower end adjustably inserted in the socket extension, a bearing-sleeve, $C'$, provided with a socket in which the upper end of tube, $a'$, is inserted, a back-rest post, having its lower end inserted in the bearing-sleeve $C'$ and adapted to turn therein, a collar, mounted on the back-rest post, the steering-head, the companion collar, mounted thereon, and the connecting-rods, having their respective ends attached to said collars, substantially as described.

In testimony whereof I affix my signature in presence of two witnesses.

HARRY J. RICHTER.

Witnesses:
L. M. FREEMAN,
L. B. COUPLAND.